(12) United States Patent
Bruesselbach et al.

(10) Patent No.: US 7,460,755 B2
(45) Date of Patent: Dec. 2, 2008

(54) METHOD AND APPARATUS FOR COMBINING LASER LIGHT

(75) Inventors: Hans W. Bruesselbach, Monte Nido, CA (US); Monica Minden, Monte Nido, CA (US); Cris Jones, Malibu, CA (US); Dave Hammon, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/759,511

(22) Filed: Jan. 15, 2004

(65) Prior Publication Data

US 2004/0165827 A1    Aug. 26, 2004

Related U.S. Application Data

(60) Provisional application No. 60/441,026, filed on Jan. 17, 2003, provisional application No. 60/441,027, filed on Jan. 17, 2003.

(51) Int. Cl.
| | |
|---|---|
| G02B 6/06 | (2006.01) |
| G02B 6/04 | (2006.01) |
| G02B 6/26 | (2006.01) |
| G02B 6/42 | (2006.01) |

(52) U.S. Cl. .................. 385/116; 385/43; 385/115; 385/121

(58) Field of Classification Search ............ 385/43, 385/115–121, 554, 556, 558
See application file for complete search history.

(56) References Cited

U.S. PATENT DOCUMENTS

| | | | |
|---|---|---|---|
| 3,912,362 A * | 10/1975 | Hudson ..................... 385/54 |
| 4,360,372 A | 11/1982 | Maciejko ................... 65/4.21 |
| 4,757,268 A | 7/1988 | Abrams et al. .............. 330/4.3 |
| 4,915,467 A * | 4/1990 | Berkey ........................ 385/43 |
| 4,932,747 A * | 6/1990 | Russell et al. ............... 385/115 |
| 4,954,152 A * | 9/1990 | Hsu et al. .................... 65/392 |
| 5,045,100 A * | 9/1991 | Smith et al. ................. 65/410 |
| 5,150,439 A * | 9/1992 | Hill et al. .................... 385/39 |
| 5,175,779 A | 12/1992 | Mortimore ................... 385/43 |
| 5,303,373 A * | 4/1994 | Harootian, Jr. .............. 385/115 |
| 5,396,506 A | 3/1995 | Ball ............................. 372/6 |
| 5,408,556 A * | 4/1995 | Wong ........................... 385/48 |
| 5,566,196 A | 10/1996 | Scifres ......................... 372/6 |

(Continued)

FOREIGN PATENT DOCUMENTS

EP    0 547 335 A2    6/1993

(Continued)

OTHER PUBLICATIONS

Kawasaki et al. "Biconical-taper single-mode fiber coupler." Optical Society of America. vol. 6, No. 7. Jul. 1981.*

(Continued)

*Primary Examiner*—M. R. Connelly-Cushwa
*Assistant Examiner*—Rhonda S Peace
(74) *Attorney, Agent, or Firm*—Ladas & Parry (57) ABSTRACT

A fiber optic apparatus formed by fusing together multiple optical fibers and stretching the fused optical fibers to form a tapered portion. The tapered portion is cleaved or cut and polished to form a facet at which an optical beam is received or transmitted.

27 Claims, 4 Drawing Sheets

U.S. PATENT DOCUMENTS

| | | | |
|---|---|---|---|
| 5,852,699 A | 12/1998 | Lissotschenko et al. | 385/115 |
| 5,881,189 A * | 3/1999 | Carberry et al. | 385/39 |
| 5,936,980 A | 8/1999 | Espindola et al. | 372/6 |
| 5,946,130 A | 8/1999 | Rice | |
| 6,134,362 A * | 10/2000 | Au-Yeung et al. | 385/43 |
| 6,208,678 B1 | 3/2001 | King | 372/72 |
| 6,272,155 B1 | 8/2001 | Sekiguchi | 372/6 |
| 6,366,356 B1 | 4/2002 | Brosnan et al. | 356/477 |
| 6,385,371 B1 * | 5/2002 | Li | 385/43 |
| 6,400,871 B1 | 6/2002 | Minden | 385/39 |
| 6,411,323 B1 | 6/2002 | Waarts et al. | 347/241 |
| 6,411,762 B1 * | 6/2002 | Anthon et al. | 385/123 |
| 6,434,302 B1 * | 8/2002 | Fidric et al. | 385/43 |
| 6,477,301 B1 * | 11/2002 | Anthon et al. | 385/43 |
| 6,515,257 B1 * | 2/2003 | Jain et al. | 219/121.73 |
| 6,600,765 B2 | 7/2003 | Evans et al. | |
| 6,827,500 B2 * | 12/2004 | Basavanhally et al. | 385/80 |
| 6,862,386 B2 * | 3/2005 | Corio et al. | 385/43 |
| 7,068,949 B2 | 6/2006 | Jung et al. | |
| 7,274,717 B1 * | 9/2007 | Minden et al. | 372/6 |
| 7,342,947 B1 * | 3/2008 | Minden et al. | 372/6 |
| 2003/0031415 A1 * | 2/2003 | Gonthier et al. | 385/43 |
| 2003/0123801 A1 * | 7/2003 | Rolston | 385/43 |
| 2004/0057475 A1 | 3/2004 | Frankel et al. | |
| 2004/0165620 A1 | 8/2004 | Rogers et al. | 372/6 |
| 2005/0163443 A1 * | 7/2005 | Antos et al. | 385/123 |

FOREIGN PATENT DOCUMENTS

| | | |
|---|---|---|
| GB | 2 154 364 A | 9/1985 |
| GB | 2 191 873 A | 12/1987 |
| WO | 2001/001919 A1 | 12/2003 |
| WO | 2004001919 A1 | 12/2003 |
| WO | 2004/068652 A3 | 8/2004 |

OTHER PUBLICATIONS

U.S. Appl. No. 10/759,510, filed Jan. 15, 2004, Rogers et al.
U.S. Appl. No. 10/893,105, filed Jul. 15, 2004, Minden et al.
U.S. Appl. No. 10/893,106, filed Jul. 15, 2004, Minden et al.
U.S. Appl. No. 10/893,105, filed Jul 15, 2004, Minden et al.
U.S. Appl. No. 10/893,106, filed Jul. 15, 2004, Minden et al.
Kapany, N.S., et al., "Coherent Interactions Between Optical Waveguides and Lasers," *Journal of the Optical Society of America*, vol. 28, No. 9, pp. 1176-1183 (Sep. 1968).
Kozolov, V.A., et al., "All-Fiber Coherent Beam Combining of Fiber Laser," *Optic Letters*, vol. 24, No. 24, pp. 1814-1816 (Dec. 15, 1999).
Lyndin, N.M., et al., "Laser System Composed of Several Active Elements Connected by Single-Mode Couplers," *Quantum Electronics*, vol. 24, No. 12, pp. 1058-1061 (1994).
Morel, J., et al., "Coherent Coupling of an Array of $Nd^{3+}$-Doped Single-Mode Fiber Lasers by Use of an intracavity Phase Grating," *Optics Letters*, vol. 18, No. 18, pp. 1520-1522 (Sep. 15, 1993).
Sabourdy, D., et al. "Efficient Coherent Combining of Widely Tunable Fiber Lasers," *Optics Express*, vol. 11, No. 2, pp. 87-97 (Nov. 22, 2002).
Sabourdy, D., et al., "Power Scaling of Fibre Lasers with All-Fibre Interferometric Cavity," *Electronics Letters*, vol. 38, No. 14, pp. 692-693 (Jul. 4, 2002).
Shirakawa, A., et al., "Coherent Addition of Fiber Lasers by Use of A Fiber coupler," *Optics Express*, vol. 10, No. 21, pp. 1167-1172 (Oct. 21, 2002).

* cited by examiner

Single Optical Input

FIG. 5A

(Distributed Optical Output)

FIG. 5B

(Optical Input)

FIG. 6A

Combined Single Optical Output

FIG. 6B

METHOD AND APPARATUS FOR COMBINING LASER LIGHT

CROSS REFERENCE TO RELATED APPLICATIONS

The present application is related to and claims the benefit of co-pending U.S. Provisional Patent Application Ser. No. 60/441,026, filed on Jan. 17, 2003 and titled "Method and Apparatus for Combining Laser Light." The disclosure of U.S. Provisional Patent Application No. 60/441,026 is incorporated herein by reference in its entirety.

The subject matter of the present application may also be related to co-pending U.S. patent application Ser. No. 60/441,027, filed on Jan. 17, 2003 and titled "Method and Apparatus for Coherently Combining Multiple Laser Oscillators." The disclosure of U.S. Provisional Patent Application Ser. No. 60/441,027 is incorporated herein by reference in its entirety.

The subject matter of the present application may also be related to co-pending U.S. patent application Ser. No. 10/759,510 filed of even date herewith. The disclosure of this U.S. patent application Ser. No. 10/750,510 is incorporated herein by reference in its entirety.

BACKGROUND

1. Field

This disclosure relates generally to coupling laser light in fibers and, more particularly, a method and apparatus for combining laser light in a fiber bundle.

2. Description of Related Art

In the fields of optical communication and lasers, particularly high power lasers, it is desirable to provide apparatus and methods for combining multiple optical sources into a single optical output and/or to provide multiple optical outputs from a single optical source. In this specification, the term "optical" is given the meaning used by those skilled in the art, that is, "optical" generally refers to that part of the electromagnetic spectrum which is generally known as the visible region together with those parts of the infrared and ultraviolet regions at each end of the visible region which are capable of being transmitted by dielectric optical waveguides such as optical fibers.

Combining multiple optical sources into a single optical output having optical power nearly equal to the sum of the powers of the individual sources can be accomplished through the combination of the optical sources. One apparatus known in the art for combining N sources is a 1×N fiber coupler. U.S. Pat. No. 5,175,779, issued Dec. 29, 1992 to Mortimore, describes a 1×N single-mode star coupler configured to couple light into multiple fibers at two wavelengths. In Mortimore, multiple single mode fibers are stripped of their primary coating and constrained around a single central fiber, which is also a single mode fiber stripped of its primary coating. All fibers are inserted into a tight fitting silica base glass capillary tube. The fiber and the tube are heated and pulled to form a tapered coupler. During the pulling process, light transmitted through the central fiber and at least one of the multiple fibers disposed around the central fiber is measured. When the light in the central fiber and the fiber disposed around the central fiber is nearly equal at the two desired wavelengths, the pulling process is terminated.

The 1×N star coupler disclosed by Mortimore and other similar apparatus known in the art provide the capability to combine optical sources at relatively lower powers. Furthermore, as the optical power in each fiber is increased, this prior art has the disadvantage that the combined power must propagate in the core of the single central fiber. When the combined optical power is high, undesirable nonlinear effects in, or damage to, the single central fiber may occur. For example, at high optical powers, Stimulated Brillouin Scattering (SBS) may arise. This nonlinear optical effect-results from the interaction of the light in the central fiber with acoustic waves in the fiber medium through which the light is propagating, producing inelastic backscattering of the light with a frequency shift equal to the frequency of the acoustic waves. The backward propagating light is amplified at the expense of the forward propagating light. Further, the acoustic waves may also be amplified by this effect, generating an acoustic intensity that can easily damage the single central fiber.

Splitting a single optical source into multiple optical outputs may also be provided by the 1×N star coupler described above, but the power handling capabilities of the coupler are again limited by the single central fiber. Further, if the optical source is a single plane wave, additional optical devices are needed to couple the plane wave into the single central fiber.

Devices are known in the art which allow an optical plane wave to be coupled to multiple fibers without using a single central fiber. For example, U.S. Pat. No. 5,852,699, issued Dec. 22, 1998 to Lissotschenko et al., discloses a coupling element having an array of lenses where each lens focuses an incident light beam onto a specific fiber in a fiber bundle. Hence, the coupling element splits the incident plane wave into multiple light beams, each of which are directed to a separate optical fiber.

The coupling efficiency for coupling an optical plane wave into multiple fibers using the approach disclosed by Lissotschenko (or other similar techniques known in the art) is generally limited to about 30%. Even assuming perfect alignment, the coupling efficiency is limited by the packing of both the fibers in the fiber bundle and the lenses in the array of lenses. The coupling efficiency is further limited by clipping that occurs at the edge of each lens in the array. Finally, the coupling efficiency is reduced because the fiber modes only accept a Gaussian-profiled fraction of the input beam. Therefore, even though the optical plane wave may be a high power optical beam, a significant portion of that power is lost when coupling the beam into multiple fibers using apparatus and methods known in the art.

U.S. 5,408,556 to Wong discloses a 1×N splitter for single-mode optical fiber that includes an individual single-mode optical fiber having its junction end juxtaposed, through a focusing lens/junction element, to the end of a bundle of arbitrarily arranged single-mode fibers which are fused together along a portion of their lengths and which have a total diameter approximately equal to the diameter of the first single-mode fiber. The 1×N splitter is formed by trimming a limited portion of the cladding from and fusing together in a bundle a plurality of parallel but randomly arranged optical fibers at a fuse region with substantially uniform heat while controllably drawing all the fibers in the bundle at the same time monitoring crosstalk from a single input fiber to all output fibers to draw down the bundle size and to promote uniform crosstalk, then cleaving the fiber bundle at the fused region, abutting and aligning a single-mode optical fiber having cladding of substantially the same diameter as the fused bundle with the cleaved fused bundle and joining the single-mode optical fiber to the cleaved fused bundle with a spot weld which forms a focusing junction. The matched sizing and focusing junction minimizes return losses due to back reflection.

Therefore, there is a need in the art for a method and apparatus for combining the optical power of multiple optical fibers to provide a single high power optical output. There is also a need in the art for a method and apparatus for coupling an optical beam into multiple optical fibers at a greater coupling efficiency than other methods and apparatus known in the art. Further, there is a need in the art for efficiently coupling an optical beam in free space into multiple optical fibers, and coupling optical beams propagating in multiple optical fibers into free space.

SUMMARY

Embodiments of the present invention provide a method and apparatus for providing for the coherent combination of the optical power in multiple optical fibers into a single optical output and provide for the coupling of the light of an optical source into multiple optical fibers. Embodiments of the present invention may be fabricated using materials and techniques well known in the art.

Embodiments of the present invention provide a controlled amount of interconnectivity between a controlled number of neighboring optical fibers, while also providing a relatively collimated beam from the fiber ensemble. The fibers may all have the same core size and/or refractive index or the core sizes and/or refractive indices of the fibers in the fiber ensemble may vary. In preferred embodiments of the present invention, the fibers in the fiber ensemble are bundled together, fused and stretched. The stretching decreases the core size of the fibers, which increases the size of the optical mode guided by the core. The stretching simultaneously decreases the spacing between the cores.

By controllably decreasing the core size and spacing, the optical power originally guided exclusively by any one of the cores may be controllably coupled to the neighboring cores. As discussed above, power coupling between adjacent optical fibers by stretching the fibers is known in the art. However, unlike the known prior art, the fused bundle in embodiments of the present invention is cut and polished (or cleaved) at a selected position along the necked-down bundle, where the fibers are stretched and fused. The point at which the fused bundle is cut and polished (or cleaved) provides a facet to which an optical beam may be coupled or from which an optical beam can be output.

When the multiple fibers are connected to multiple optical sources, an optical beam will emerge from the facet. The optical beam will consists of beamlets, each larger (10's of microns) than the normal size (~6 microns diameter) of fiberoptic beams, and thus not as prone to damage the output facet.

BRIEF DESCRIPTION OF THE DRAWINGS

The features and advantages of the present invention will become better understood with regard to the following description, appended claims, and accompanying drawings.

DETAILED DESCRIPTION

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of certain elements shown in the accompanying drawings may be exaggerated to more clearly show details. The present invention should not be construed as being limited to the dimensional relations shown in the drawings, nor should the individual elements shown in the drawings be construed to be limited to the dimensions shown.

Figure 1:
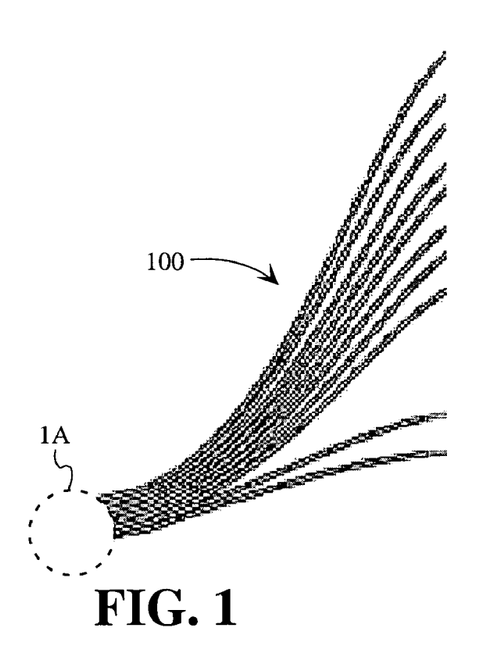
FIG. 1 shows an embodiment of the present invention comprising a bundle of optical fibers fused at one end.
Figure 1A:
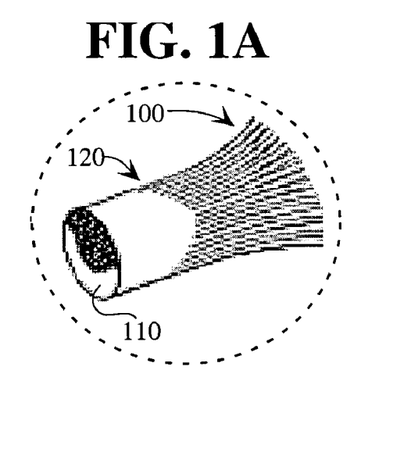
FIG. 1A shows an enlarged view of the fused end of the fiber bundle depicted in FIG. 1.

FIG. 1 illustrates the preferred embodiment of the invention, which comprises a large bundle of regularly arrayed optical fibers 100. The optical fibers 100 are preferably single-mode fibers. The optical fibers 100 are fused at one end and stretched. The fused end is cut and polished (or cleaved) to produce a facet 110 through which a free space optical beam can be received or transmitted. FIG. 1A shows an enlarged view of the fused fibers 100 and the facet 110. FIG. 1A also shows a minimal taper 120 of the bundle at the point where it is cut and polished to produce the facet 110. However, the preferred embodiment will in general have more taper.

The preferred embodiment of the present invention is fabricated by assembling the optical fibers 100 in the fiber bundle in a regular array. Such arrays include hexagonal close packing, square packing, and a three-nearest-neighbor packing. Although manufacturing tolerances may result in a certain amount of randomness in the array, the device is still useful even if the optical fibers 100 are not perfectly arranged. This array of fibers is then fused together and stretched using techniques well known in the art, such as those techniques used for the fabrication of tapered fiber couplers. After the bundle of fibers has been fused and stretched, the bundle is cut and polished, or cleaved, at a selected location to provide the facet 110. The facet 110 provides for the entrance of a single beam into the apparatus and the distribution of that beam among the optical fibers in the array. The facet 110 also provides for the exit of a single beam from the apparatus, which may be fed by optical sources coupled to the multiple fibers 100.

Figure 2A:
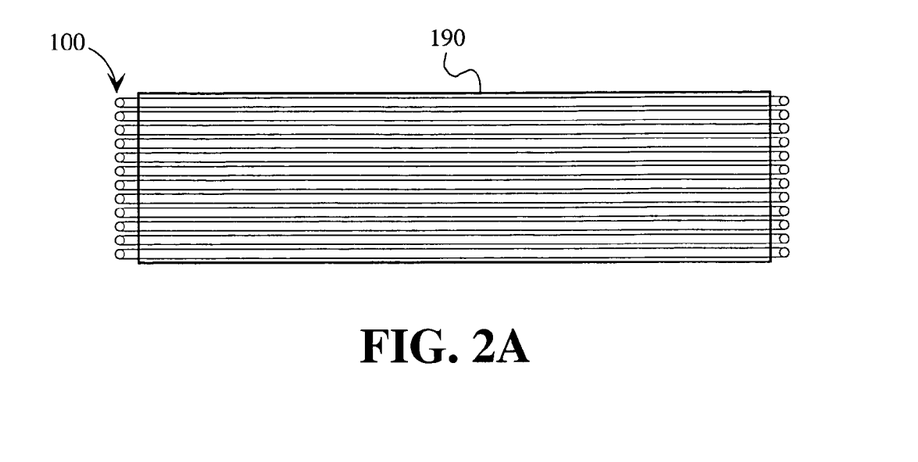
FIG. 2A shows a first step in fabricating an embodiment of the present invention where a plurality of fibers is disposed adjacent each other.
Figure 2B:
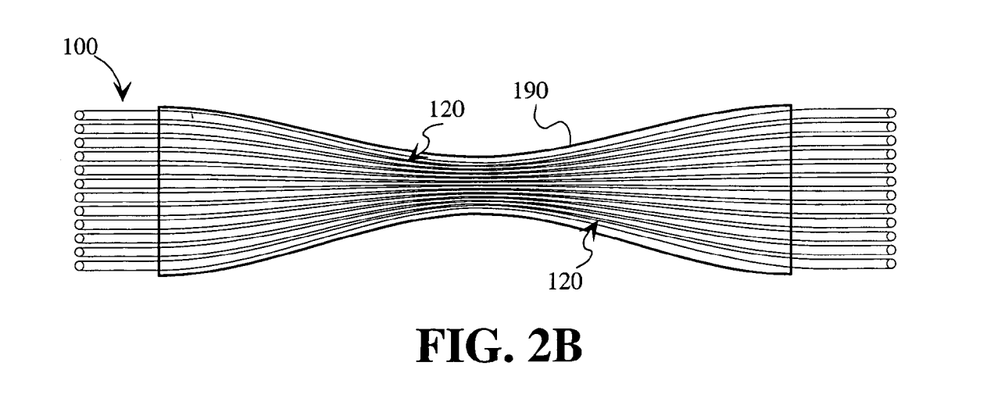
FIG. 2B shows a subsequent step in fabricating an embodiment of the present invention where the plurality of fibers are fused and stretched so as to taper the fibers.
Figure 2C:
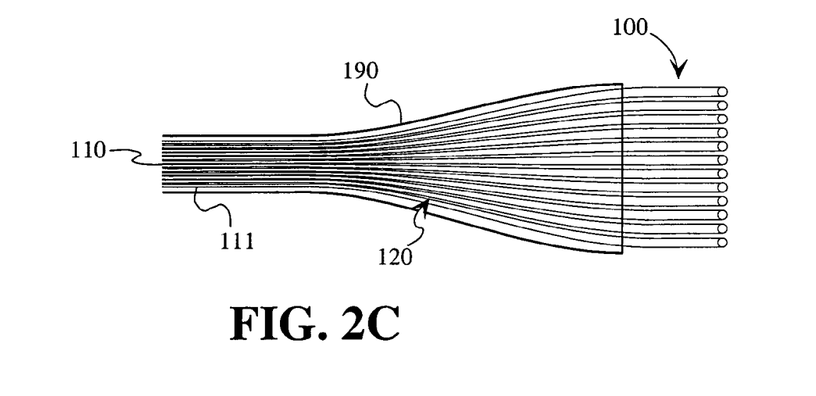
FIG. 2C shows the final configuration of an embodiment of the present invention where the stretching of the plurality of fibers is completed and the fused bundle is cleaved.

FIGS. 2A-2C illustrate a typical process for fabricating embodiments according to the present invention. FIG. 2A shows the array of fibers 100 assembled within a tube 190. FIG. 2B shows the array of fibers 100 after a fusing and stretching process is begun. As shown in FIG. 2B, the stretching process causes the array of fibers 100, as well as the tube 190, to obtain a taper 120. FIG. 2C shows the completion of the fabrication process, in which the array of fibers 100 terminates in a smaller diameter fused fiber section 11, which is cleaved to provide the facet 110. The location at which the fused fiber section 111 is cleaved is a matter of design, and as will be seen, can be used to determine the amount of coupling between neighboring fibers 100 in the array.

To make fabrication of the device simpler, to facilitate assembly and maintenance of specific array patterns throughout the fabrication procedure, or to improve the device's performance, several techniques used in the glass fabrication art may be used. For example, the bundle of fibers 100, in an array with the desired configuration, can be first assembled inside a tube 190 (as shown in FIG. 2A) possibly having a lower melting temperature than the softening temperature of the fused silica fibers 100. This assembly can then be heated to the temperature where the tube 190, but not the fibers 100, melts, and the melted tube 190 is allowed to flow into the spaces between the fibers 100. Fluorosilicate glass is one type of material that may be used for the protective tube 190. This assembly may then be subsequently further heated, to a temperature at which the fibers 100 soften, and the stretching and tapering is done. If the heating and stretching is uniformly carried out, the geometric pattern of the array will be more easily maintained with the use of this melted matrix than when air pockets occur between the fibers 100. To avoid the loss of the propagating light into this melted matrix, the tubing glass is preferably chosen to have a refractive index equal to that of the fiber cladding. However, tubing glass having a lower refractive index may also be used, and is generally easier to obtain. The melted matrix then functions as an outer cladding, guiding the light within the fiber claddings. Similar results could be achieved by first coating each individual fiber 100 (or the preform from which it is made, or as it is being pulled) with the lower melting temperature glass.

Figure 3A:
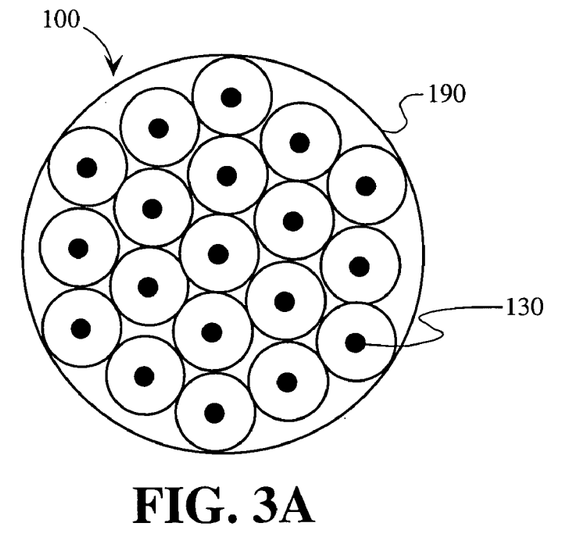
FIG. 3A illustrates a cross section of the plurality of fibers assembled in an array prior to stretching.
Figure 3B:
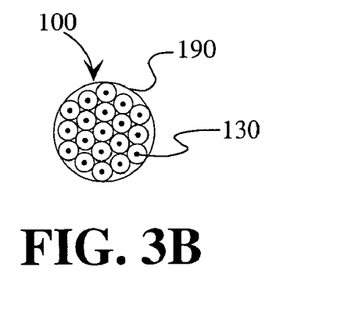
FIG. 3B illustrates a cross section of the plurality of fibers after the fibers have been stretched and the individual diameters reduced.

The degree to which the fused portion of the array is stretched is a matter of design. Typically, the fused portion of the array is stretched to give the desired mode size and degree of coupling between fibers. In general, when the array of fibers 100 is stretched, the cross-sectional shape of each fiber 100 can be preserved, except that the fiber 100 is proportionately miniaturized. Shown in FIG. 3A is a cross section of an array of fibers 100 with cores 130 before stretching, and shown in FIG. 3B is the same array of fibers 100 with cores 130 after stretching. In general, the diameter of each fiber 100 is reduced to be on the order of tens of microns, while the stretched region may be stretched several centimeters or more. It has been found experimentally that >~2× stretching provides the desired results. Note that FIG. 3A appears to depict fibers 100 with approximately the same core size. Alternative embodiments of the present invention may comprise fibers 100 with different core sizes and/or refractive indices.

The procedure used to calculate the coupling of the fibers to their neighbors consists of selecting a packing arrangement, a ratio of core size to cladding size (that is, the particular type or specifications of the fiber), and a degree of stretch and length of the stretched region, that produces the desired coupling. What makes coupling to neighbors possible is the fact that the size of the mode propagating through the fiber increases as the V-number of the fiber gets smaller and a greater fraction of the power propagates outside the core, overlapping adjacent cores. The V-number is a well-known fiber parameter and is defined as:

$$V = \rho k (n_{core}^2 - n_{clad}^2)^{1/2}$$

where $\rho$ is the radius of the core, k is the wavenumber of the light, $n_{core}$ is the refractive index of the fiber core, and $n_{clad}$ is the refractive index of the fiber cladding.

Figure 4A:
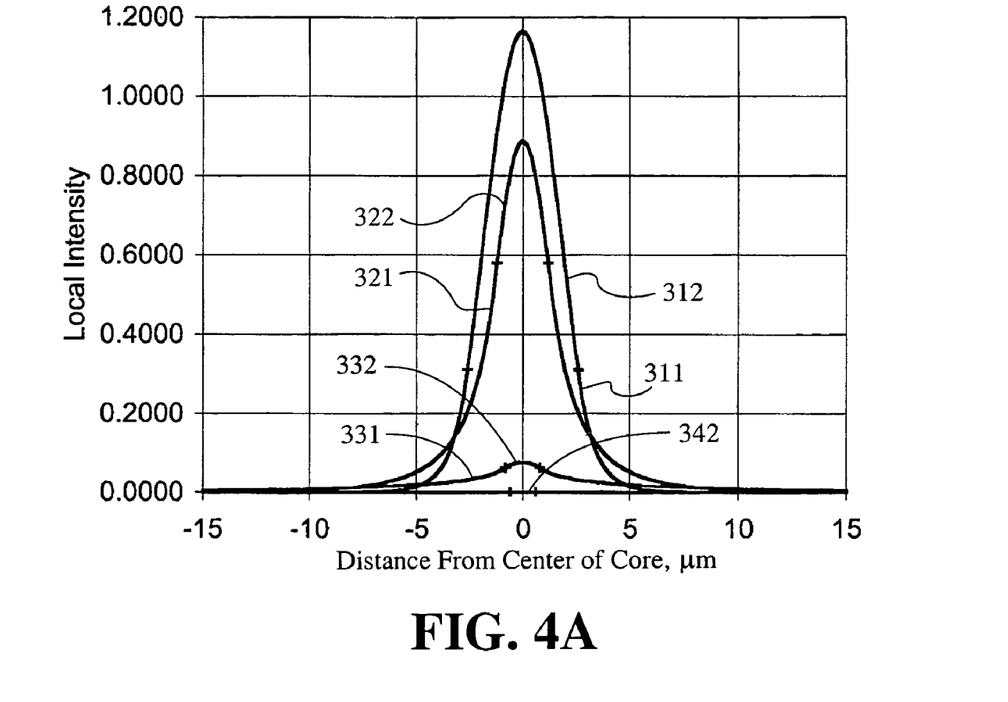
FIG. 4A presents a linear plot of calculated mode shapes for fibers that have decreased diameters due to stretching.

Mode shapes of light propagating within an optical fiber can be calculated and FIG. 4A presents instructive examples of such calculations. FIG. 4A presents plots of local intensity and the curves shown in the plots have been normalized so that the total power (the integral of the intensity over the fiber area) is the same in all cases. For example, if the original fiber diameter is 120 µm with a step-index core diameter of 6 µm, the intensity of the mode shape calculates to be the curve 311 in FIG. 4A, with the profile inside the core being shown by curve 312 (roughly the portion of the curve 311 located between the points ±3 µm distance from the core). As can be seen, the intensity of curve 311 quickly tapers off to essentially zero at locations roughly 10 µm radially outwards from the core. The decrease in the intensity is more clearly illustrated in FIG. 4B, which presents a semilogarithmic plot of the intensities shown in FIG. 4A. Because the core of the nearest fiber would be 120 µm away, there is effectively no coupling between the fibers 100 in the array in this configuration.

Figure 4B:
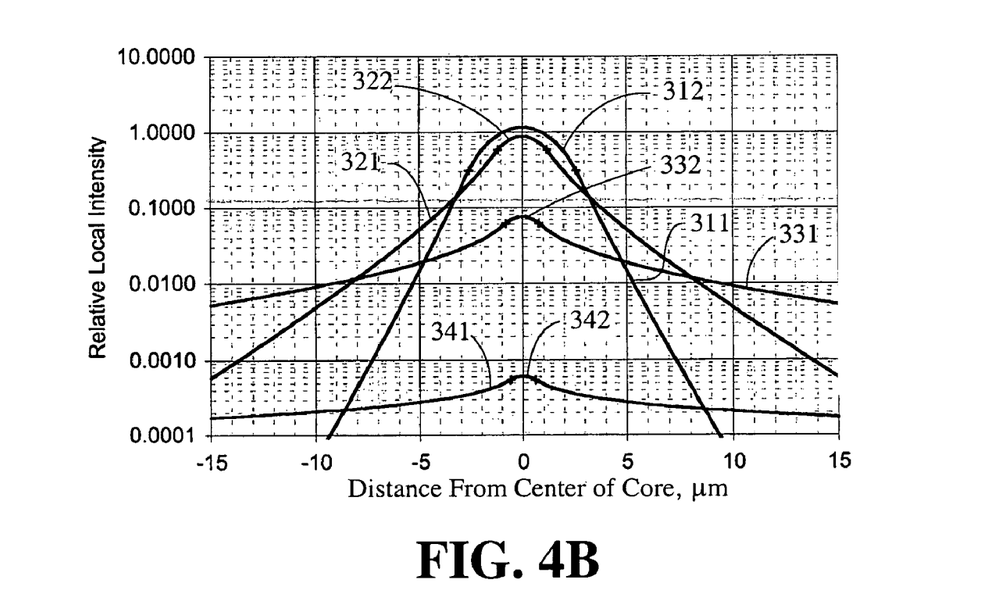
FIG. 4B presents a semi-logarithmic plot of the calculated mode shapes shown in FIG. 4A.

If this same fiber is now contemplated as being stretched so that its diameter is 60 micrometers (2X stretching) then the calculated mode shape is as shown by curve 321, with the profile inside the now-smaller core being shown by curve 322 (roughly the portion of the curve 321 located between the points ±1.5 µm distance from the core). FIGS. 4A and 4B show that a greater proportion of the mode is now outside the core. In this configuration, the mode has a little intensity as far away as locations roughly 60 µm radially outwards from the core. Because the core of the nearest fiber would be 60 µm away, there is a small amount of desirable coupling between the fibers 100 in the array.

If the fiber is further stretched so that its diameter is only 42 µm (about 3X stretching), the mode shape calculates to be curve 331, with the profile inside the core being shown by curve 332 (roughly the portion of the curve 331 located between the points ±0.75 µm distance from the core). FIGS. 4A and 4B show the mode shape in the stretched fiber to be quite widely spread. As can be seen in FIG. 4B, the intensity of the mode is still quite significant at locations roughly 15 µm and more radially outward from the core.

FIG. 4B also shows with curve 341 the calculated mode shape for 4X stretching, that is, where the fiber diameter is only about 30 µm. As can be seen in FIG. 4B, the mode intensity is significantly less than that seen with lesser degrees of stretching. However, the intensity within the core (shown by curve 342 and roughly the portion of the curve 341 located between the points ±0.50 µm distance from the core) is only slightly greater than the intensity outside of the core. Hence, with 4X stretching, there is likely to be significant coupling with other fibers 100 in the array.

FIGS. 4A and 4B illustrate how the intensity spreads as the fibers are stretched. FIGS. 4A and 4B also show that a degree of stretch can be found that gives a desired amount of coupling.

Figure 5A:
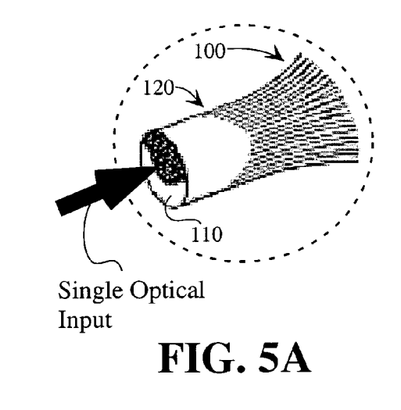
FIG. 5A illustrates an enlarged view of the fused end of the fiber bundle depicted in FIG. 1A according to one embodiment.
Figure 5B:
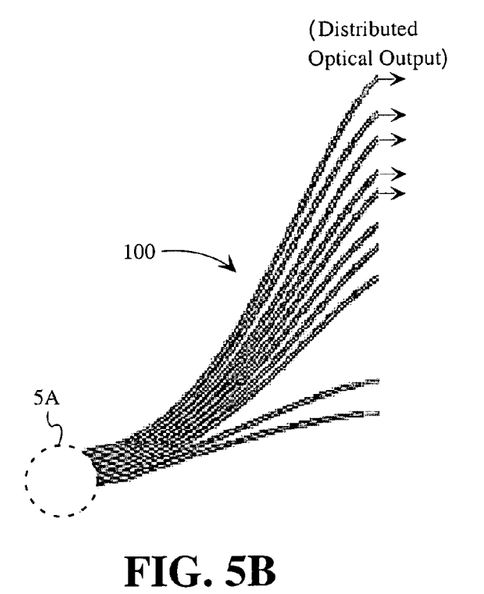
FIG. 5B illustrates the bundle of optical fibers according to the embodiment shown in FIG. 5A.

If the device is to be used to couple a free space beam into an ensemble of fibers 100 as shown in FIGS. 5A and 5B, the sum of the mode shapes can be calculated, and the core/cladding size ratio and stretch selected, to maximize coupling of the free space beam into the core ensemble. In the limit of very large taper, the device can be heuristically thought of as simply a tapered fused silica rod, with the wide end separating into an ensemble of fibers. The single optical input enters at the facet 110. The fibers located nearer to the center of the array will generally receive the majority of the light, while the fibers located at the perimeter of the array will generally receive less light. So long as all the light in each fiber is derived from the same single optical input, the light in each optical fiber will be coherent. As it propagates, nearly all of the light will be collected by one or another of the weakly guiding cores arrayed inside the rod. As the rod enlarges into a bundle, the light collected by each core condenses to a smaller size, until at the other end of the device, the light has distributed itself into the ensemble of fibers to provide a plurality of distributed optical outputs.

Figure 6A:
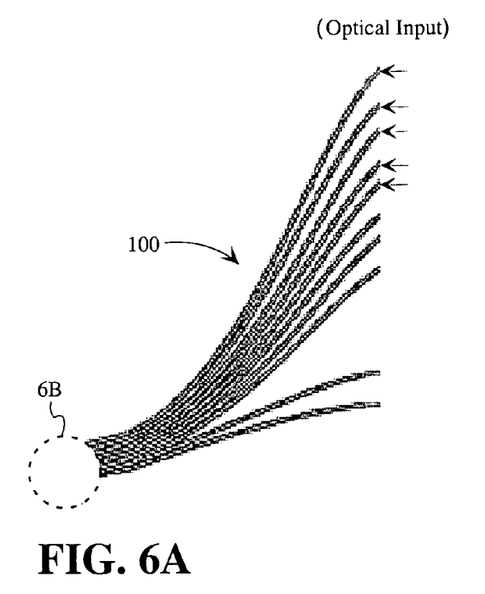
FIG. 6A illustrates the bundle of optical fibers according to another embodiment.
Figure 6B:
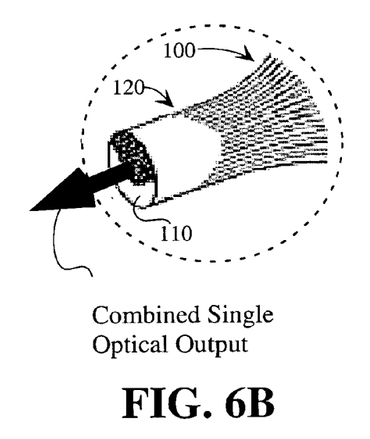
FIG. 6B illustrates an enlarged view of the fused end of the fiber bundle depicted in FIG. 6A.

Alternatively, the device may be used to combine multiple optical inputs into a single combined optical output as shown in FIG. 6A and 6B. All the optical inputs are preferably coherent and in phase, and may be derived from the same source. One technique for providing multiple coherent input beams and controlling them to have the same phase at the facet 110 is discussed in U.S. Pat. No. 6,400,871. If the optical inputs are not coherent then undesirable effects such as speckling may be present in the combined single optical output. Also, the quality of the combined single optical output will be significantly reduced if the optical inputs are not derived from the same source and they have different wavelengths. Because of the effects shown in FIGS. 4A and 4B, as the core of each fiber becomes smaller, the diameter of the beam in the fiber becomes larger. As a result, each of the beamlets (one beamlet per fiber in the array) which comprise each optical input in each optical fiber emerges from the facet 110 having a diameter (~10's of microns) larger than the normal diameter of each beamlet in each optical input (~6 microns). As a result, the combined single optical output can have a diameter in the 100's of micrometers or more, depending on the size of the bundle. Because of the large diameter of the individual optical outputs emerging from the facet 110 to form the combined single optical output, the facet 110 is less likely to incur damage, and nonlinear SBS (Stimulated Brillouin Scattering) effects can be reduced.

From the foregoing description, it will be apparent that the present invention has a number of advantages, some of which have been described herein, and others of which are inherent in the embodiments of the invention described or claimed herein. Also, it will be understood that modifications can be made to the apparatus and method described herein without departing from the teachings of subject matter described herein. As such, the invention is not to be limited to the described embodiments except as required by the appended claims.

What is claimed is:

1. A fiber optic apparatus comprising:
    a plurality of optical fibers, each optical fiber having a first end and a second end, said plurality of fibers being fused together along a section of each optical fiber proximate the first end of each optical fiber to form a fused section having a fiber axis, the fused section of the plurality of optical fibers being tapered to form a tapered region, wherein the second end of the fibers are detached from each other; and
    a facet, said facet being formed by cutting and polishing or by cleaving said tapered region in a direction perpendicular to said fiber axis; said facet having a cross section other than approximately equal to the cross section of an individual single-mode fiber.

2. The apparatus of claim 1, wherein the plurality of optical fibers disposed in the fused section are uniformly stretched to provide a desired amount of optical coupling between each optical fiber.

3. A fiber optic apparatus comprising:
    a plurality of optical fibers, each optical fiber having a first end and a second end, said plurality of fibers being fused together along a section of each optical fiber proximate the first end of each optical fiber to form a fused section having a fiber axis, the fused section of the plurality of optical fibers being tapered to form a tapered region; and
    a facet, said facet being formed by cutting and polishing or by cleaving said tapered region;
    wherein the plurality of optical fibers disposed in the fused section are stretched to provide a desired amount of optical coupling between each optical fiber; wherein the facet is adapted to receive a single optical input traveling in free space, the fibers having each a core and a cladding and a mode shape, the sum of the mode shapes of the fibers being calculated, and the core/cladding size ratio and stretch being selected, to maximize coupling of the free space beam into the core ensemble; the single optical input being distributed amongst each optical fiber in the plurality of optical fibers.

4. The apparatus of claim 3, wherein the plurality of optical fibers are arranged in an array, the array being selected from a member of the group consisting of hexagonal close packed arrays, square close packed arrays, and three-nearest neighbor packed arrays.

5. The apparatus of claim 3, wherein the plurality of optical fibers is provided in a glass matrix.

6. The apparatus of claim 5, wherein the glass matrix is comprised of fluorosilicate.

7. The apparatus of claim 3, wherein each optical fiber has a core diameter, the core diameter of each optical fiber in the tapered region being smaller than the core diameter of each optical fiber in a non-tapered region.

8. The apparatus of claim 3, wherein the optical input has a diameter, and wherein the diameter of the optical input at the first end of a given optical fiber is larger than the diameter of the same optical input at the second end of the given optical fiber.

9. The apparatus of claim 3, wherein at least one optical fiber of the plurality of optical fibers has a different core size and/or refractive index from at least one other optical fiber of the plurality of optical fibers.

10. The fiber optic apparatus of claim 3, wherein said facet has a direction perpendicular to said fiber axis.

11. A fiber optic apparatus comprising:
    a plurality of single mode silica optical fibers, each optical fiber having a first end and a second end, said plurality of fibers being fused together along a section of each optical fiber proximate the first end of each optical fiber to form a fused section having a fiber axis, the fused section of the plurality of optical fibers being tapered to form a tapered region; and
    a facet, said facet being formed by cutting and polishing or by cleaving said tapered region in a direction perpendicular to said fiber axis; wherein said facet has a cross section other than approximately equal to the cross section of an individual single-mode fiber.

12. The fiber optic apparatus of claim 11, where the fibers have each a core and a cladding and a mode shape; where the plurality of optical fibers in the fused section are uniformly stretched to provide a desired amount of optical coupling between each optical fiber; and where the sum of the mode shapes of the fibers is calculated, and the core/cladding size ratio and stretch are selected, to maximize coupling of the free space beam into the core ensemble.

13. A fiber optic apparatus comprising:
a plurality of optical fibers, each optical fiber having a first end and a second end, said plurality of fibers being fused together along a section of each optical fiber proximate the first end of each optical fiber to form a fused section having a fiber axis, the fused section of the plurality of optical fibers being tapered to form a tapered region; and
a facet, said facet being formed by cutting and polishing or by cleaving said tapered region;
wherein the plurality of optical fibers disposed in the fused section are stretched to provide a desired amount of optical coupling between each optical fiber; and wherein each optical fiber is adapted to receive an optical input from a plurality of optical inputs at the second end, and wherein the plurality of optical inputs are emitted into free space at the facet as a single combined optical output.

14. A method for coupling light comprising:
providing a plurality of optical fibers, each optical fiber having a first end, a second end, and a central core extending between the first and second end;
fusing the optical fibers together along a section of each optical fiber proximate the first end to form a fused section;
tapering the fused section of the optical fibers such that a core diameter of each optical fiber proximate the first end is smaller than the core diameter proximate the second end, wherein tapering the fused section comprises uniformly stretching the plurality of optical fibers to provide a desired amount of optical coupling between each optical fiber;
forming a facet by cutting and polishing or by cleaving said fused section in a direction perpendicular to the core; and
illuminating the facet with the light, wherein said illuminating further comprises:
illuminating the facet with a single optical input traveling in free space; and
distributing the single optical input amongst each optical fiber in the plurality of optical fibers to provide a plurality of distributed optical outputs.

15. The method of claim 14, further comprising the steps of:
arranging the plurality of optical fibers in an array; and
disposing the plurality of optical fibers in a glass matrix.

16. The method of claim 15 wherein the array is selected from a member of the group consisting of hexagonal close packed arrays, square close packed arrays, and three-nearest neighbor packed arrays.

17. The method of claim 15, wherein the glass matrix comprises fluorosilicate.

18. The method of claim 14 wherein the optical input has a diameter, and wherein the diameter of the optical input at the first end of a given optical fiber is larger than the diameter of the same optical input at the second end of the given optical fiber.

19. The method of claim 14, wherein at least one optical fiber of the plurality of optical fibers has a different core size and/or refractive index from at least one other optical fiber of the plurality of optical fibers.

20. A method for coupling light comprising:
providing a plurality of optical fibers, each optical fiber having a first end, a second end, and a central core extending between the first and second end;
fusing the optical fibers together along a section of each optical fiber proximate the first end to form a fused section;
tapering the fused section of the optical fibers such that a core diameter of each optical fiber proximate the first end is smaller than the core diameter proximate the second end, wherein tapering the fused section comprises uniformly stretching the plurality of optical fibers to provide a desired amount of optical coupling between each optical fiber;
forming a facet by cutting and polishing or by cleaving said fused section in a direction perpendicular to the core; and
illuminating the facet with the light, wherein said illuminating further comprises:
providing an optical input at the second end of each optical fiber; and
emitting the optical inputs as a single combined optical output at the facet into free space.

21. An apparatus for coupling light comprising:
a plurality of single mode optical fibers, each optical fiber having a first end and a second end, said plurality of fibers being fused together along a section of each optical fiber proximate the first end of each optical fiber to form a fused section having a fiber axis, the fused section of the plurality of optical fibers being tapered to form a tapered region; and
a facet, said facet being formed by cutting and polishing or by cleaving the tapered region in a direction perpendicular to said fiber axis, wherein the facet is adapted to receive a single optical input, the single optical input being distributed amongst each optical fiber in the plurality of optical fibers, wherein the optical input has a diameter, and wherein the diameter of the optical input at the first end of a given optical fiber is larger than the diameter of the same optical input at the second end of the given optical fiber; said facet having a cross section other than approximately equal to the cross section of an individual single-mode fiber.

22. The apparatus of claim 21, wherein the plurality of optical fibers are arranged in an array, the array being selected from a member of the group consisting of hexagonal close packed arrays, square close packed arrays, and three-nearest neighbor packed arrays.

23. The apparatus of claim 21, wherein the plurality of optical fibers are provided in a glass matrix.

24. The apparatus of claim 23, wherein the glass matrix is comprised of fluorosilicate.

25. The apparatus of claim 21, wherein each optical fiber has a core diameter, the core diameter of each optical fiber in the tapered region being smaller than the core diameter of each optical fiber in a non-tapered region.

26. The apparatus of claim 21, where the fibers have each a core and a cladding and a mode shape; the plurality of optical fibers in the fused section are uniformly stretched to provide a desired amount of optical coupling between each optical fiber; and where the sum of the mode shapes of the fibers is calculated, and the core/cladding size ratio and stretch are selected, to maximize coupling of the free space beam into the core ensemble.

27. The apparatus of claim 21, wherein at least one optical fiber of the plurality of optical fibers has a different core size and/or refractive index from at least one other optical fiber of the plurality of optical fibers.

* * * * *